United States Patent Office 3,350,660
Patented Oct. 31, 1967

3,350,660
VICINITY DETECTOR
Jean Engdahl and Henri de Reynold, Neuchatel, Switzerland, assignors to Ebauches S.A., Neuchatel, Switzerland, a firm
Filed Feb. 1, 1965, Ser. No. 429,559
Claims priority, application Switzerland, Feb. 5, 1964, 1,327/64
4 Claims. (Cl. 331—65)

ABSTRACT OF THE DISCLOSURE

An oscillator for a vicinity detector serving to determine the approach or the presence of a ferro magnetic object having a first and second capacitatively coupled, tuned oscillating circuits each with a capacitor and a coil, a transistor serving as the active element, a detecting head housing a coil of one of the oscillating circuits, the inductance of the coil being variable by the object to be detected; the oscillating circuit having this head being connected to the base electrode circuit of the transistor and the other oscillating circuit being connected in the collector electrode circuit of the transistor; a source of direct current having positive and negative terminals; a circuit of emitters for modifying the gain of the transistor as a function of the amplitude by means of a pair of diodes whereby the approach or the presence of the ferro magnetic object in the vicinity of the detection head untunes the oscillating circuits one with respect to the other.

---

Figure 1:
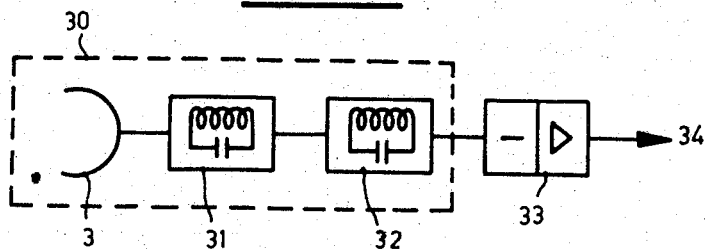

In the course of manufacturing or machining operations, one has frequently to determine the approach or the presence at a given place of an object, for instance of a part of a machine-tool or of a part of the piece to be machined. One may have, for instance, to know, from a signal, that a given part of a machine-tool is crossing a certain area, or else that a slide or runner is reaching its extreme position, said signal setting an alarm or causing a further machining step to start.

To this end, it is usually resorted to micro-switches which engage or disengage an electric circuit when the object or the part to be watched reaches a given position. However, such switches have various drawbacks: their intrinsic inertia renders them unable to provide rapid information with a high repetition frequency. The lifetime of such contacts is usually restricted to a few millions of commutations, which is quite insufficient in the case of machines operating at high speeds. The mechanical contacts are prone to rebound, which is specially unfavourable when a perfectly univocal signal is needed, as is for instance the case with the operation of computers used for treating information. When using mechanical contacts, one always runs the risk that their reaction sensitiveness and the reproducibility of the electric contact be disturbed by corrosion or dirt.

In order to remedy the above-mentioned drawbacks, it has already been resorted to photo-electric detectors for indicating the presence or the approach of a given object. While such photo-electric detectors are free from the above-mentioned drawbacks, such as wear and tear, rebounding of the contacts and inertia, however they have other drawbacks which prevent a perfectly safe operation of these detectors: on the one hand, the optical system crossed by the light ray is highly responsive to the presence of dust or of vapours of any type and, on the other hand, there is a risk that the very sensitive photo-electric cell be influenced by the light surrounding the apparatus or by dispersed light, which can easily lead to erroneous information; moreover, the lifetime of the electric bulb is limited, in particular if it is not carefully protected against shocks and vibrations. In addition, it is very difficult to adjust and align the optical system of the photo-electric detectors in such a manner that very small displacements of the object to be watched bring about an accurate and reproducible reaction of the detector.

One object of the invention is to provide a vicinity detector free from the drawbacks of mechanical switches and of the photo-electric detectors, and which, with relatively simple means, provides highly responsive and accurately reproducible information.

According to a first feature, the vicinity detector according to the invention, comprises an oscillator provided with two coupled oscillating circuits tuned to each other in the absence of an object to be watched, and also a detection head mounted in one of the oscillating circuits and which, when said object is drawing near, modifies the resonance frequency of that circuit in such a manner that the oscillator immediately stops oscillating, whereas it starts oscillating again as soon as said object withdraws.

According to another object of the invention, said vicinity detector is provided for signaling the approach of an object of ferro-magnetic material, the detection head containing the coil of one of said oscillating circuits, the inductivity of which is modified by the presence of said object.

According to a still further object of the invention, the detection head comprises, for signaling the presence of a non-ferro-magnetic object, the capacitor of one said oscillating circuits, the capacity of which is modified by the approach or the presence of said object.

Further features of the present invention will be disclosed hereafter, reference being had to the accompanying drawing, in which FIG. 1 is a block diagram of the vicinity detector according to the invention.

Figure 2:
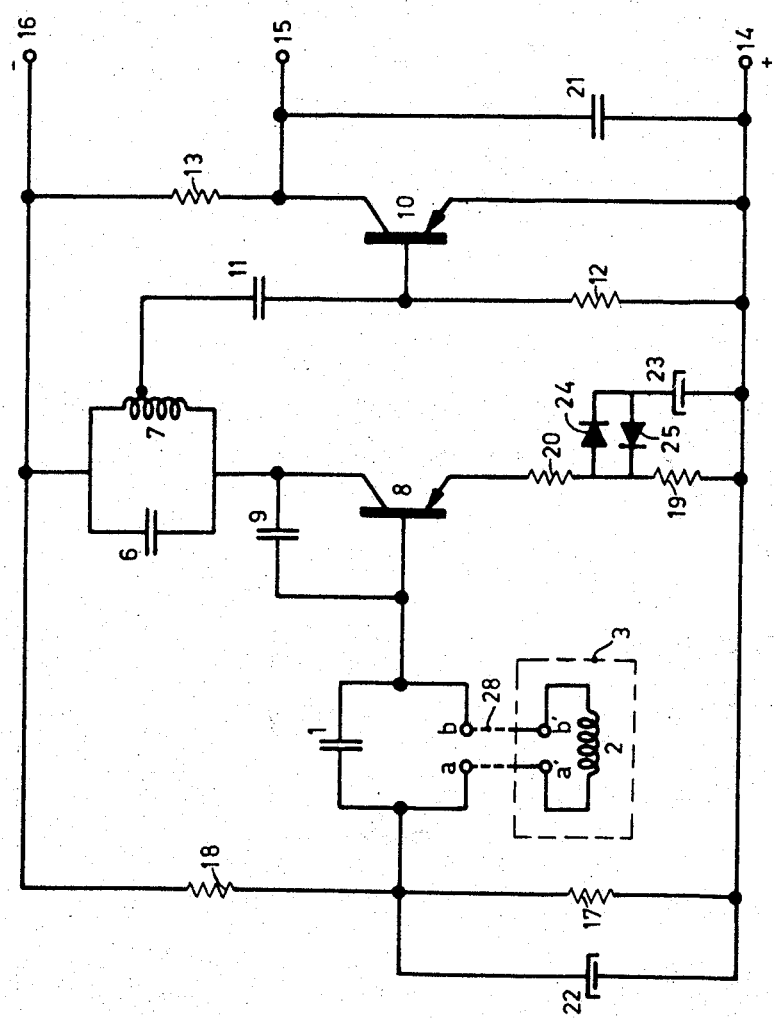

FIG. 2, the detailed diagram of a form of embodiment in which the detection head retains the coil of one of the oscillating circuits.

Figure 3:
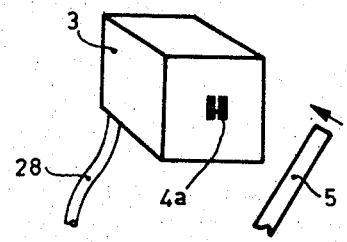

FIG. 3, a perspective diagrammatic view of the detection head.

Figure 4:
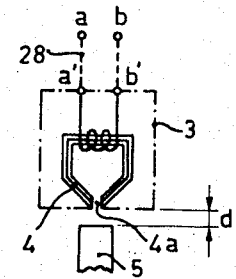
Figure 5:
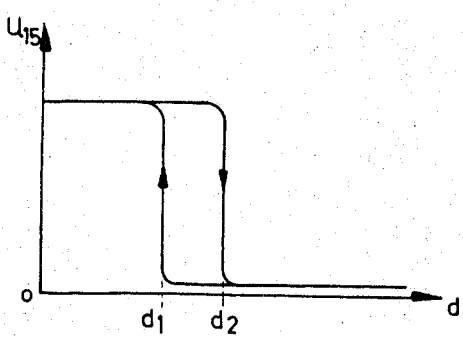

FIG. 4, a cross section of the detection head shown in FIG. 3 and,

FIG. 5, a chart representing the engagement and disengagement characteristics of the oscillator.

The principle of the vicinity detector according to the invention is represented in the block diagram of FIG. 1.

The oscillator 30 comprises two oscillating circuits 31 and 32, which are coupled and tuned to each other, and also the detection head 3 forming a part of oscillating circuit 31, and constituting a part of the inductivity or of the capacity of oscillating circuit 31. The detection head 3 can also be constituted by the coil or the condenser itself of oscillating circuit 31.

So long as the inductivity or the capacity of detection head 3 has not been modified by the approach or the presence of an object to be watched, both circuits 31 and 32 remain tuned, and oscillator 30 can freely oscillate. The output signal is transmitted, through an output stage 33, to a line 34, through which it is applied to an indicating device or a logical circuit for a further treatment.

The conditions at the output 33 are symbolically represented, in FIG. 1, by the combination of a negating element and of an amplifier.

Since it is normally desired to obtain the "0" output signal in the absence of the object under watch, and the "1" signal in the presence of said object, the negating element is placed immediately after the oscillator, said element delivering the "0" signal when the oscillator is oscillating, whereas it delivers the "1" signal in the absence of oscillations. The amplifier of the output circuit can be so provided that it carries out the rectification of the oscillator output signal.

In the form of embodiment, shown in FIG. 2, of the block diagram of FIG. 1, the detection head 3 contains the coil 2 of the oscillating circuit 31. This vicinity detector is thus adapted to be used for watching objects made of a ferromagnetic material which by its presence modifies the inductivity of coil 2.

The circuit shown in FIGURE 2 is housed, with the exception of detection head 3 surrounded by a dashed line, in an easily transportable casing, which forms a building unit. This unit is connected to the detection head 3 (see FIG. 4) by means of a flexible cable 28, preferably a coaxial cable, the extremities of which are referenced a, b and a', b', respetcively. The detection head 3 is mounted in the vicinity of the place where it is desired to watch the passage or the presence of an object, whereas the above-mentioned unit comprising the oscillator can be located at some distance, for instance in a control desk or in a switch box, in which are also to be found the elements for feeding direct current to the oscillator and some of the utilisation circuits of the signal delivered by the oscillator in the form of a direct voltage for controlling a relay or feeding other electronic circuits.

The active element of the oscillator of FIG. 2 is constituted by a transistor 8 cooperating with the two oscillating circuits, constituted by a capacitor 1 and a coil 2, and a capacitor 6 and a coil 7, respectively. The oscillating circuit, the coil 2 of which is housed in the detection head 3, and the inductivity of which is modified by the object under watch, is mounted in the base-electrode circuit of transistor 8, whereas the second oscillating curcuit comprising a fixed capacity and an inductonce mounted in the collector-electrode circuit of transistor 8.

The collector-electrode of transistor 8 is connected to the base-electrode, and the transistor carries a capacitor 9 which ensures a coupling between the two oscillating circuits.

The two resistors 17 and 18 connected in series between the positive terminal 14 and the negative terminal 16 of a source of direct current, act as a voltage divider for the negative polarisation of the base-electrode of transistor 8. The uncoupling of resistor 17, when the oscillator is in the oscillating state, is achieved by a capacitor 22 connected in parallel with said resistor.

The emitter-electrode of transistor 8 is connected to the positive terminal 14, so that the current flows through the two resistors 19 and 20, and also through the anti-parallel diodes 24 and 25, in series with capacitor 28; such a circuit of emitters constitutes a counter-reaction for the oscillator, which modifies the gain of transistor 8, as a function of the amplitude of oscillation.

The oscillator output voltage, which is derived from a portion of coils 7 of the second oscillating circuit, is applied through a capacitor 11 at the base of an output stage constituted by transistor 10, the appropriate polarisation of the base-electrode of said transistor being provided by resistor 12. This transistor 10 acts both as an amplifier and a rectifier, the voltage drop through the resistor of collector 13 being substantially equal to the voltage applied when said transistor is in the conductive state, so that the output voltage at the terminals 14 and 15 is substantially zero, whereas in the non-conductive stage the output voltage at said terminals is substantially equal to the feed voltage. The capacitor 21 connected between the output terminals 14 and 15 ensures a filtration of the output signal. The signal delivered at said output terminals is used for operating a relay, or else it can be used in subsequent treatment circuits. In particular, it is possible to control logic elements, the input impedance of which is fairly high, so that the capacitor 21 is large sufficient for ensuring the filtration of the output signal.

The above described oscillator operates as follows:

When induction coil 2 of the detection head is not modified by the approach or the presence of a ferromagnetic object, the two oscillating circuits are accurately tuned to each other. To this end, the induction coil 7, or the capacitor 6 of the second oscillating circuit is preferably adjustable to the desired frequency. If such is the case, the coupling through capacitor 9 exceeds the counter-reaction, so that the gain of transistor 8 is somewhat higher than unity, then the oscillator freely oscillates. A portion of that alternating voltage is derived from coil 7, to control the output stage; in order to restrict the load of the second oscillating circuit as much as possible, the derivation ratio is chosen as equal to ⅛, which, on the one hand, is sufficient for fully commutating transistor 10 and, on the other hand, constitutes a substantially zero load for the oscillator. Since transistor 10 is in the conductive state, the voltage at terminals 14 and 15 drops substantially to zero, and the signal delivered corresponds to the "0" signal.

When a ferro-magnetic object comes near the detection head 3, the inductivity of the first circuit is modified and, therefore, also the resonance frequency of said first circuit, which results in an untuning of the circuit constituted by coil 2 and capacitor 1, with respect to the circuit constituted by coil 7 and capacitor 6. The presence of a ferro-magnetic object in the vicinity of the detection head 3 produces a decrease of the impedance of the first resonance circuit, which results in a decrease of the amplitude of the signal applied to the base-electrode of transistor 8. The alternating current through the anti-parallel diodes 24 and 25 will decrease accordingly, so that the operating point of these diodes is moved to a zone of higher dynamic resistance, which results in an abrupt reinforcement of the counter-reaction on transistor 8, the gain of which drops lower than unity, and which is no longer sufficient to sustain the oscillations.

In this manner, oscillations are abruptly interrupted. Under such conditions, only a direct current will flow through transistor 8, coil 2 in the base electrode circuit and coil 7 in the collector-electrode circuit acting only as resistors. The moment the oscillations of the oscillator are interrupted, the negative polarisation or transistor 10 through capacitor 11 vanishes, so that said transistor is abruptly blocked. At that time, the negative voltage feeding terminal 16 is applied to the output terminal 15 through resistor 13. When the object under watch is again moving away from the detection head 3, the resonance frequency of the first oscillating circuit again approaches that of the second oscillating circuit, and when the gain of transistor 8, due to the increase of the reaction, reaches unity, the oscillator starts oscillating again. The increase of the current through diodes 24 and 25 results in a decrease of the counter-reaction so that oscillations are abruptly resumed. A portion of the voltage of the oscillating circuit is derived from coil 7 and applied to the base-electrode of transistor 10 through capacitor 11, which thus becomes conductive. The voltage at the output terminal 15 substantially drops to that of terminal 14.

Diodes 24 and 25 provide the oscillator with the characteristics of a switch, so that the interruption or the resumption of the oscillations takes place abruptly, independently of the speed with which the object is approaching or moving away, and moreover an hysteresis phenomenon occurs in the behaviour of the oscillator, a phenomenon which will be examined more in detail in connection with FIG. 5.

According to FIGS. 3 and 4, the detection head comprises a U-shaped laminated core 4, the base of which is wrapped with the coil 2 of the first oscillating circuit, the two legs of the U being bent one towards the other, in order to form a small air-gap 4a. The coil and the core are preferably coated with an insulating synthetic material, so that detection head 3 is a highly resistant measuring device. The air-gap 4a is located on the surface of the block of synthetic material forming the head, and it constitutes the measuring device proper. This air-gap can be for instance 0.5 mm. (0.02 in.) wide.

In FIGS. 3 and 4, the object under watch is referenced 5, and the distance between object 5 and air-gap 4a is referenced $d$. FIG. 5 shows the characteristic curves corresponding to the oscillator engagement and disengagement, said curves giving the output voltage versus distance $d$ between the object under watch and the air-gap. When object 5 draws near the air-gap, the output voltage abruptly appears at point $d_1$, and it is no longer modified when the object draws nearer. If the object again moves away from air-gap 4a, $d$ increases and oscillations are resumed, which causes the disappearance of the output voltage at a distance $d_2$ greater than $d_1$. The oscillating circuit as disclosed permits to reproduce the values $d_1$ and $d_2$ with accuracy; the difference $\Delta d$ between $d_1$ and $d_2$ can for instance be determined with a precision corresponding to $\Delta d = 0.01$ mm., $d_1$, i.e. the distance at which the vicinity detector according to the invention reacts, can be comprised between 0.5 and 1 mm., whereas $$\Delta d = d_2 - d_1$$

represents 10% of $d_1$.

In view of the hysteresis due to the fact that elements 24 and 25 in the oscillator circuit are not linear, it is possible to very simply achieve a perfectly univocal engagement or disengagement of the oscillator's oscillations.

The feed voltage will be so chosen that the output signal voltage will correspond to the voltage generally used for feeding the logic elements to be found on the market, 12 volts for instance.

According to another form of embodiment (not shown here), the circuit of FIG. 2 can be modified so that both resonant circuits are mounted in the collector-electrode circuit of a transistor, which here is, preferably an npn transistor, with the coupling of the output stage showing in the emitter-electrode circuit of said transistor.

Of course, other known oscillating circuits can be used to the same end. In particular, the active element of the oscillator need not be a transistor, and any other element having a negative resistance can be used. The non-linear elements producing the hysteresis can be located somewhere else in the oscillator circuit.

Finally, the detection head can contain the capacitor of the first oscillating circuit instead of the coil, the approach of the object under watch then modifying the capacity of that capacitor, for instance by penetrating between the plates thereof. In such a case, the object under watch can be made of any material. In addition, the detection head can assume other various shapes and it is not limited to the above example. In particular, said detection head can be so connected that one of the terminals $a$ or $b$ is directly connected to a terminal of the power source, the latter terminal being earthed, so that the terminal of the detection head is permanently earthed.

What is claimed is:
1. An oscillator for a vicinity detector serving to determine the approach or the presence of a ferro magnetic object comprising
   (A) first and second, capacitatively coupled, tuned oscilliating circuits, each having a capacitor and a coil of a given inductance;
   (B) a transistor having a base-electrode circuit, a collector-circuit and an emitter;
   (C) a detecting head housing said coil of said first oscillating circuit, said inductance of said coil being variable by said ferro magnetic object;
   (D) said first oscillating circuit being connected in said base-electrode circuit of said transistor and said second oscillating circuit being connected in said collector circuit;
   (E) a source of direct current having positive and negative terminals connected to said oscillating circuits;
   (F) an emitter circuit for modifying the gain of said transistor as a function of the amplitude said circuit consisting of a pair of anti-parallel diodes, whereby the approach or the presence of said ferro magnetic object untunes said oscillating circuits one with respect to the other.

2. Oscillator according to claim 1, having output terminals and a capacitor connected between said terminals for filtering the output signal therefrom.

3. Oscillator according to claim 1, having a pair of series-connected resistors between said positive and negative terminals of said current source for negatively polarising said base electrode of said transistor.

4. Oscillator according to claim 3, having a capacitor in parallel with one of said series-connected resistors for uncoupling said resistor when said oscillator is in its oscillating state.

References Cited
UNITED STATES PATENTS

| | | | |
|---|---|---|---|
| 2,405,526 | 8/1946 | Sinnett | 331—181 X |
| 2,573,172 | 10/1951 | Ennis et al. | 331—181 X |
| 2,600,928 | 6/1952 | Semm | 331—181 X |
| 2,611,020 | 9/1952 | Ralston et al. | 331—181 X |
| 2,972,116 | 2/1961 | Lowe | 331—117 |
| 2,977,414 | 3/1961 | Adler et al. | |
| 3,034,022 | 5/1962 | Worland. | |
| 3,140,450 | 7/1964 | Tavis | 331—65 X |
| 3,147,408 | 9/1964 | Yamamoto et al. | |

OTHER REFERENCES

Donner, "Position Detector," IBM Technical Disclosure Bulletin, vol. 6, No. 5, October 1963, pages 24, 25.

ROY LAKE, *Primary Examiner.*

J. B. MULLINS, *Assistant Examiner.*